INVENTOR.
Quentin A. Kerns

Aug. 12, 1958     Q. A. KERNS     2,847,270
CALUTRON OSCILLOGRAPH SYSTEM
Filed Nov. 28, 1945     3 Sheets-Sheet 3
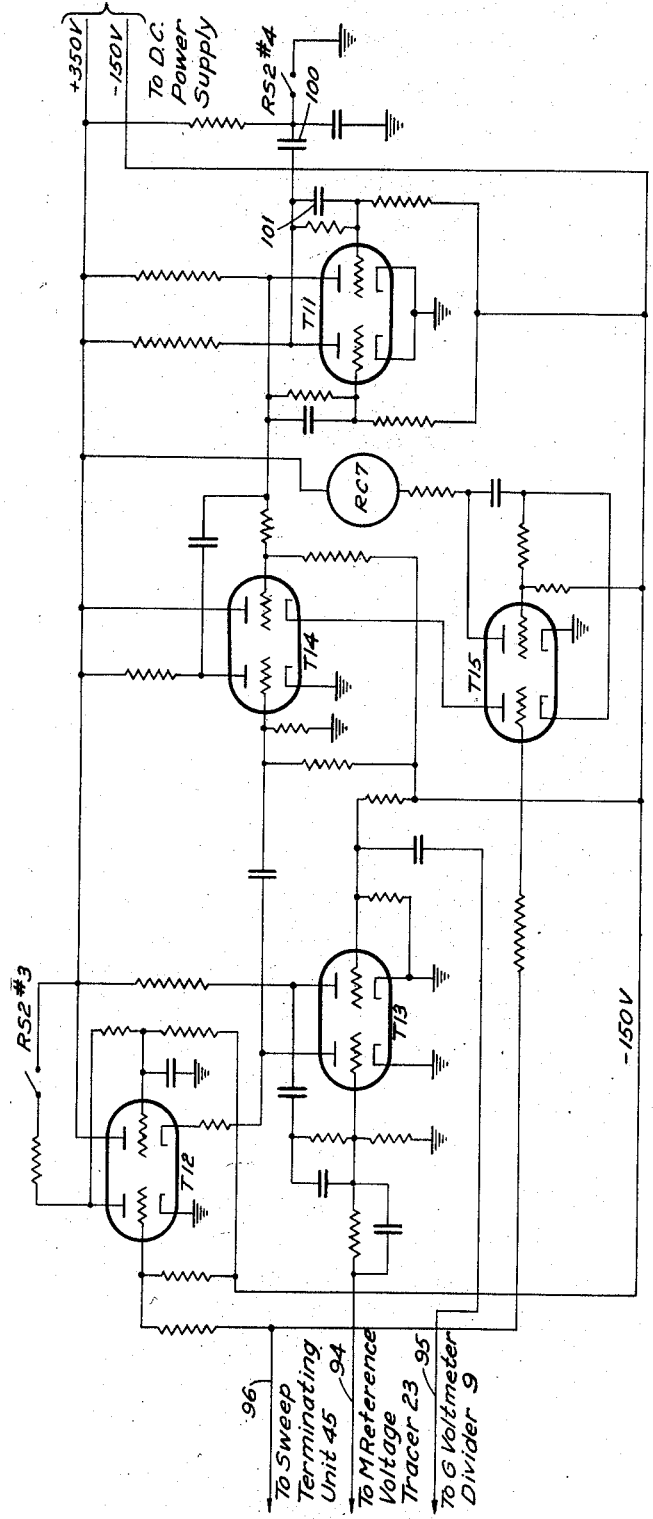
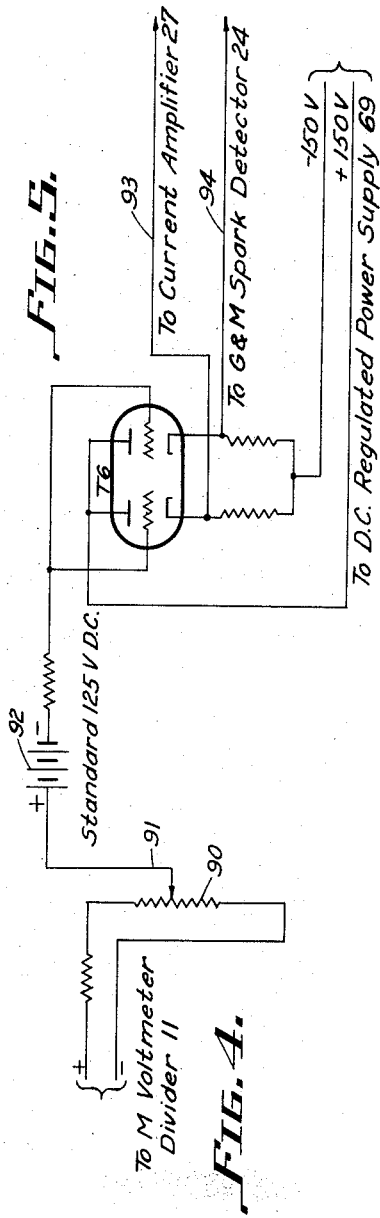
INVENTOR.
Quentin A. Kerns
BY United States Patent Office 2,847,270
Patented Aug. 12, 1958

2,847,270
CALUTRON OSCILLOGRAPH SYSTEM

Quentin A. Kerns, Oak Ridge, Tenn., assignor to the United States of America as represented by the United States Atomic Energy Commission Application November 28, 1945, Serial No. 631,422

28 Claims. (Cl. 346—17)

This invention relates generally to isotope separating apparatus of the electromagnetic type commonly referred to as a "calutron," and more particularly, to circuits and equipment useful in connection with the determination of the space curve of optimum focus of a calutron ion beam.

In a calutron, the ion beam for a particular isotope is substantially in the form of a semi-cylinder beginning at the ion source and terminating at the ion receiving equipment, and having a radius of curvature proportional to the square root of the mass-per-unit-charge ratio of the ions forming that beam. While it may be said that a particular ion beam as a whole tends to focus 180 degrees from the source on a cylinder of a particular radius, nevertheless for successive points across the beam in a direction parallel to the axis of the cylinder (Z direction), there exist small variations in the focal point. These variations may occur both in a direction parallel to the line joining the source and the receiver (X direction) and in a direction perpendicular thereto (Y direction). The loci of these focal points is termed the space curve of optimum focus of the ion beam.

For most efficient operation of a calutron it is obviously desirable to have the entrance slit of the receiver conform to this space curve of optimum focus. The accurate determination of this focal curve is therefore a prerequisite to the design of an efficient receiver.

The primary object of the present invention is to provide circuits and equipment for obtaining a series of oscillographic photographs from which the space curve of optimum focus of a calutron ion beam may be accurately computed.

Another object of the invention is to provide electrical circuits and oscillographic equipment generally useful for quickly obtaining a series of photographs recording operating characteristics of a machine or device.

An object of the invention is to provide electrical apparatus for simultaneously generating a linear sweep voltage and controlling the operation of a recording oscillograph.

Another object of the invention is the provision of a circuit for applying a linear sweep to the accelerating voltage of a calutron.

Still another object of the invention is to provide a novel and adjustable voltage sweep circuit of general utility.

Another object of the invention is to provide a novel and improved electronic time delay circuit.

A further object of the invention is to provide a novel and adjustable sweep voltage terminating circuit.

Still a further object of the invention is the provision in apparatus for recording the operating characteristic of a machine or device of visual means for indicating the occurrence of abnormal conditions during the making of such record.

Other objects and advantages will become apparent from the specification, taken in connection with the accompanying drawings, wherein the invention is embodied in concrete form.

In the drawings,

Fig. 4 is a wiring diagram of the M reference voltage tracer of Fig. 1.

Fig. 5 is a wiring diagram of the G and M spark detector of Fig. 1.

Similar characters of reference are used in all of the above figures to indicate corresponding parts.

Figure 1:
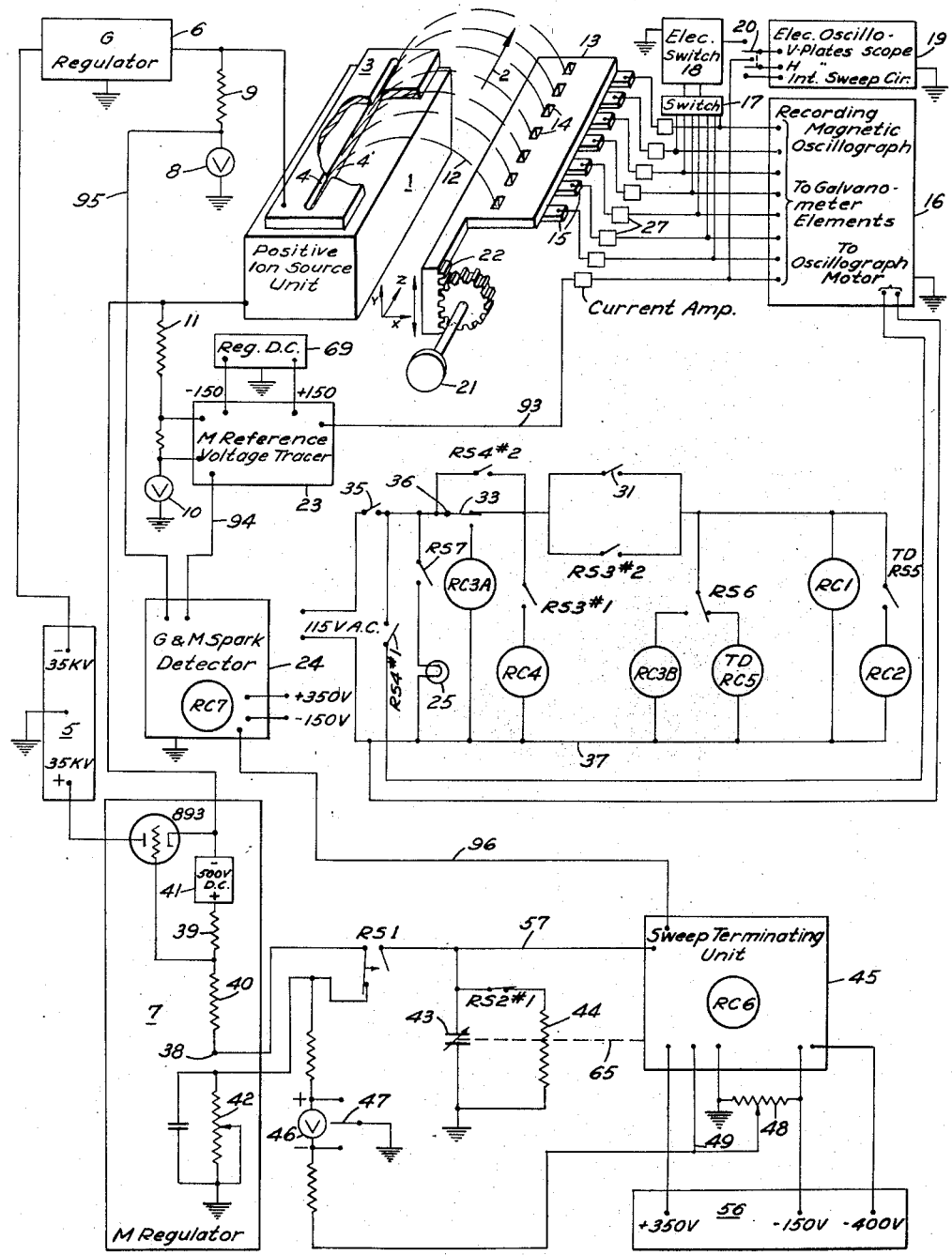
Fig. 1 is a schematic and wiring diagram of the complete system, including calutron, for obtaining the graphs necessary to determine the space curve of optimum focus.

Referring to Fig. 1, there is schematically indicated a positive ion source unit 1 which may be of any suitable type adapted to provide a supply of positive ions of the "charge" material, the isotopes of which are to be separated in the calutron. It will be understood that the source unit 1 as well as the receiving equipment 13 is located within an evacuated tank or container, not shown, and that a substantially uniform magnetic field, indicated schematically by the arrow 2, traverses the tank in the Z direction.

An accelerating plate 3 having a slit 4 is provided directly above the source unit 1, said slit being aligned with a similar slit 4' in the upper surface of the source unit. A direct current power source 5 supplies a negative "G" voltage of perhaps 35 kv. to the accelerating plate 3 through a G voltage regulator 6, and a positive "M" voltage of perhaps 35 kv. to the source unit 1 through the M voltage regulator 7. The G voltage is indicated on a meter 8 in series with a voltmeter divider 9 connected across the G supply, and the M voltage is similarly indicated on a meter 10 in series with a voltmeter divider 11 connected across the M supply.

As fully explained in U. S. patent application Serial Number 557,784, entitled "Method of and Apparatus for Separation of Materials," filed October 9, 1944, in the name of Ernest O. Lawrence, now Patent No. 2,709,222, the 70 kv. difference of potential between the accelerating plate 3 and the source unit 1 draws a beam 12 of positive ions through the slits 4', 4 in the source unit and accelerating plate, which beam is coerced by the influence of the magnetic field to travel in a circular path to receiving equipment 13 at the opposite end of the evacuated tank. Since the radius of curvature of the beam is proportional to the square root of the mass-per-unit-charge ratio of the ions forming the beam, several beams are in fact formed, one for each of the isotopes of the charge material. Beam 12 will be understood to represent that beam formed of the particular isotope which it is desired to separate. The receiving equipment 13 is positioned in the X direction at such a point that it will intercept that particular beam which is formed of the singly ionized ions of the isotope to be separated.

Because of small variations in initial direction and magnitude of velocity of the positive ions, and for diverse other reasons, the beam for a particular isotope is not always too well resolved or focused at the receiving equipment, but rather may be spread over a considerable distance in the X direction. As a result, if the receiving equipment were gradually moved through the beam in the X direction, and the current due to the arrival of positive ions were measured and plotted against the X coordinate, a curve would be obtained which would have a maximum at a particular X coordinate and would fall off to zero on either side of the maximum. The position of the receiver in the X direction which would correspond to the maximum or peak value of current intensity could be thought of as the point of optimum focus in the X direction for the beam as a whole.

Similarly, a point of optimum focus could be found in the Y direction. Obviously, by adjusting the position of the receiver in both the X and Y directions, a point (X, Y) of optimum focus could be found for the beam as a whole. Now if the beam were to be divided up into discrete and separate portions, each having a particular Z coordinate, a distinct X, Y point of optimum focus could be found for each of these separate portions of the beam. In other words a series of points of optimum focus, each having an X, Y, and Z coordinate, could be found. The locus of these points is designated the space curve of optimum focus, and, in general, it may be said that it does not lie in any one plane.

The purpose of the equipment disclosed herein is the determination of this space curve of optimum focus. Such focal curve determinations are necessary in the design of the calutron receiver, and also are useful in connection with studies of the effect on the curve of optimum focus of various electrical and structural changes which may be made in the calutron itself, particularly in the source unit and accelerating equipment.

For the purpose of determining this space curve the ordinary calutron receiving equipment is replaced in this case by a receiver guard plate 13 having a plurality of small rectangular slots 14 spaced at equal intervals in the Z direction. Guard plate 13 may be adjustably positioned in the Y direction from a manually operable knob 21 operating through a suitable mechanical arrangement schematically indicated as rack and pinion 22. Underneath each of slots 14 is an associated receiving electrode 15 through which an electric current is caused to flow as a result of, and proportional to, the positive ions traversing the associated slot and striking the electrode.

In this way, the whole ion beam is split up in the Z direction into a plurality, in this case seven, of discrete representative beams, each of which may be analyzed separately. Each of the electrodes is connected through an associated conventional current amplifier 27 to an associated galvanometer element of a recording magnetic oscillograph 16. These electrodes are also connected to a manually operable switch 17 at which any two of them may be selected to be alternately connected to energize the vertical plates of an electronic oscilloscope 19 through an electronic switch 18 and a second manual switch 20.

Figures 2, 3:
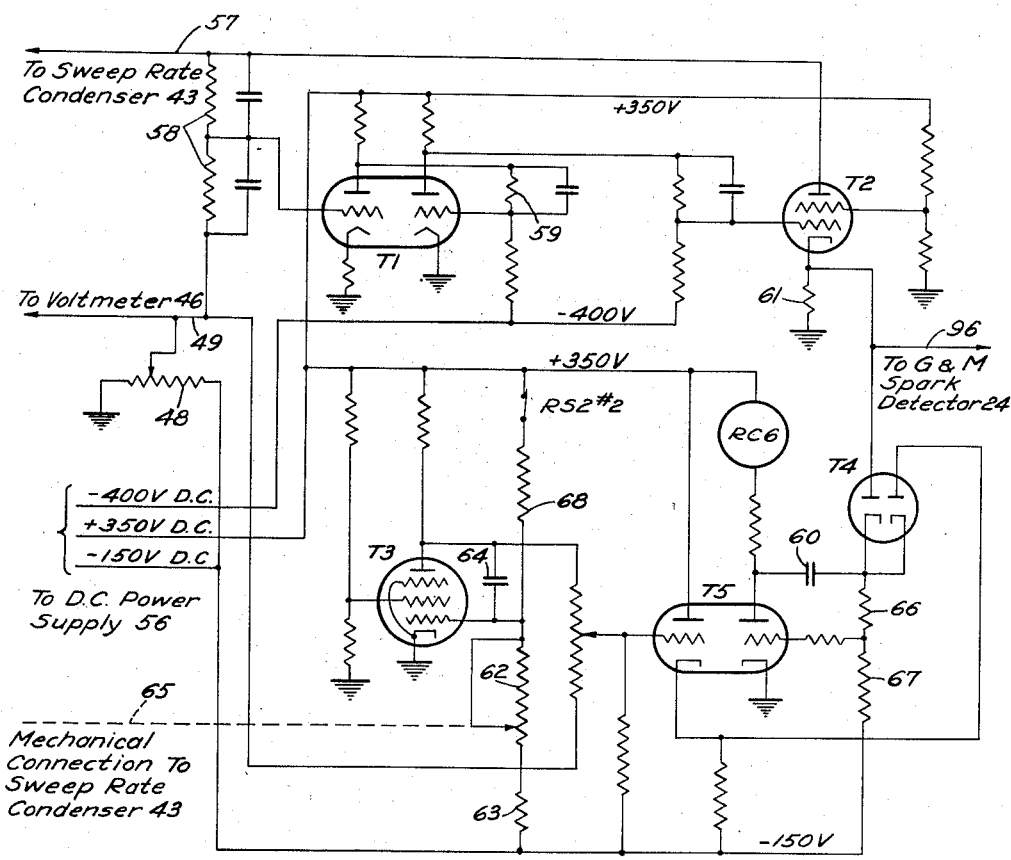
Fig. 2 is a wiring diagram of the sweep terminating unit of Fig. 1.
Fig. 3 is a diagram illustrating the wave form of the calutron accelerating voltage under different modes of operation.

The effect of moving the receiving equipment in the X direction is obtained by applying a linear sweep to the M voltage by means of apparatus to be fully described hereinafter, thereby moving the beam in the X direction with respect to the receiving equipment. Thus, the M voltage is caused to vary in the manner indicated by reference numeral 34 in Fig. 3, the linear sweep occurring between the points C and D, and the actual voltage rise amounting to perhaps 2000 volts. During the linear sweep the ion beam is caused to sweep across the slots 14 in the X direction, thereby causing each of the electrode currents to rise to a maximum and then fall off again to zero. At the same time that the ion beam is sweeping across the slots 14, the magnetic oscillograph motor is driving the exposed recording film at a constant speed. Accordingly, there is obtained a photograph containing seven separate curves each having a maximum value occurring at a different abscissa along the time axis. In order to be able to convert the abscissa coordinates to corresponding values of M voltage and thence to corresponding X coordinates in the calutron, an M voltage signal is obtained from a portion of the M voltmeter divider 11 and is connected to an eighth galvanometer element through the M reference voltage tracer 23, lead 93, and current amplifier 27. Accordingly, an eighth curve, having the shape of the M voltage wave form, and varying in the manner indicated by reference numeral 34 in Fig. 3, is superimposed on the graph.

It will be appreciated that the above mentioned graph corresponds to a particular position of the receiver guard plate 13 in the Y direction. By adjustment of knob 21 a series of such graphs may be obtained for a corresponding series of Y coordinates. From such a series of graphs it is possible to determine either mathematically or graphically the space curve of optimum focus.

A G and M spark detector 24 is provided in order to detect the occurrence of either G or M sparks, or other abnormal conditions, during a sweep. If no such abnormalities occur during the making of a graph, the spark free indicator lamp 25 is caused to light. If no such spark free signal is received, that particular graph is disregarded as being obtained under abnormal conditions.

When switch 20 is in its upper position, any two of the receiving electrodes 15 may be alternately connected to the vertical plates of the electronic oscilloscope 19 through the action of electronic switch 18. In such case, the M sweep voltage, shown in Fig. 3 and obtained from the M reference voltage tracer 23 through current amplifier 27, is applied to the horizontal plates to serve as the horizontal sweep. Two curves then appear on the electronic oscilloscope of beam intensity versus X coordinate for the 2 receiver electrodes selected by switch 17. If the M sweep voltage wave form itself is desired to be shown, switch 20 is placed in its lower position, in which case the M sweep voltage is applied to the vertical plates, and the internal sweep circuit of the oscilloscope is applied to the horizontal plates.

Thus far the general operation of the system has been described. The various switching and control circuits and the manner in which they effect such operation will now be considered. Relays play an important part in the control system. In the interest of clarity, no attempt has been made in the drawings to locate relay switches adjacent to the particular relay coils which control their operation. However, each relay coil is given a particular numerical designation, such as RC2, and the relay switch control thereby is given the same numerical designation, such as RS2. Where more than one relay switch is controlled simultaneously by but one relay coil, the switches are given additional numerical designations, such as RS2 #1, RS2 #2, etc., to distinguish them from each other. All relay switches are shown in their normal or non-energized position.

There are three different modes of operation of the system which can be effected by appropriate switching. In the first of these, the recurrent sweep switch 31 is closed and the M voltage is thereby caused to continuously repeat the sweeping action, as shown by the dotted wave form 32 in Fig. 3. Only the electronic oscilloscope is employed with this mode of operation and no graph is obtained. The second mode of operation is effected by momentarily depressing the motor run switch 33 while the recurrent sweep switch 31 is closed. In such case the solid line wave form 34 of Fig. 3 is instituted up to the time E at which time the recurrent sweep is continued. The magnetic oscillograph motor operates from time B to time E, and one graph is obtained. The third mode of operation is initiated by momentarily depressing the motor run switch 33 with the recurrent sweep switch 31 open. In such case, the M voltage wave form is illustrated by solid line 34 of Fig. 3, one graph being obtained, as in the second mode of operation, and the sweep being discontinued thereafter. Before any of these modes of operation can be initiated the main power control switch 35 must be closed to connect supply leads 36 and 37 to the 115 volt alternating current power supply. In order to obtain the series of graphs required to compute the space curve of optimum focus, either the second or third modes of operation may be employed, the position of the receiver guard plate 13 being varied in the Y direction each time a separate graph is made.

In every case, the variation of M voltage is obtained by changing the effective resistance between point 38 in the M regulator 7 and ground. Between the output of the M regulator and ground is a voltage divider consisting of a standard direct voltage source 41, say of 500 volts, resistor 39, resistor 40, and the variable resistance between point 38 and ground. The primary action of the regulator is to vary the output voltage as required in order to maintain a constant current through the divider of such a value that the voltage drop through resistor 39 just balances the voltage rise across the standard 500 volt source, thereby maintaining the cathode and grid of the regulating tube, preferably type 893 as shown, at the same potential. Variations from this constant current value effect changes in the grid voltage and internal impedance of the 893 tube, which in turn cause the regulated output voltage to change in such a direction as will return the current through the divider to its constant value. Since the current through the divider is thus maintained constant, the total M voltage may be considered as the sum of the constant voltage drop across resistor 40 plus the variable voltage drop appearing between point 38 and ground. It is this latter variable voltage which is actually shown in Fig. 3. With relay switch RS1 in its normal position, as shown, this voltage is adjustable by potentiometer resistor 42 to a value $V_1$ of say 2000 volts.

Let it now be assumed that recurrent sweep switch 31 is closed at time B to initiate the recurrent sweep. Time delay relay coil RC5 and relay coil RC1 are energized, and relay switch RS1, which is of the make-before-break type, is immediately changed over, thus removing potentiometer resistor 42 from the voltage divider and inserting in its stead the parallel circuit consisting of the variable sweep rate condenser 43 and resistor shunt 44. Resistor 44 is of such a small ohmic value as to constitute practically a short circuit, and the potential of point 38 immediately falls almost to ground dropping the M voltage about 2000 volts. After a predetermined period of time, however, time delay relay switch RS5 closes at time C, energizing relay coil RC2 and opening relay switch RS2 #1. The constant voltage divider current is now forced into condenser 43 charging it at a constant rate. When the voltage across the condenser attains a predetermined value $V_2$ at time D, it is prevented from rising further by the action of the sweep terminating unit 45, as will later be described in detail. At time E the sweep terminating circuit 45 energizes relay coil RC6 switching relay switch RS6 to its left position and deenergizing time delay relay coil RC5. Time delay relay switch RS5 immediately returns to its open position, deenergizing RC2 and allowing RS2 #1 to return to its closed position. Condenser 43 immediately discharges through resistor 44, RC6 is deenergized and RS6 returns to its right position. The whole control system has now been returned to its original condition and the cycle continues to repeat itself in the same manner. It will be noted that RC1 is energized continuously while recurrent sweep switch 31 is closed so that RS1 is maintained in the position in which point 38 is connected to condenser 43.

Suppose now during recurrent sweeping the motor run switch 33 is momentarily depressed at time A to initiate the second mode of operation. RC1 is immediately deenergized and RS1 is returned to its normal position, reinserting resistor 42 in the voltage divider circuit and returning the potential of point 38 to its normal value $V_1$. Time delay RC5 is also deenergized resulting in the opening of switch RS5, and relay RC2 is deenergized resulting in the closing of switch RS2 #1. At the same time RS3 #1 is closed due to the energization of RC3A. Relay switches RS3 #1 and RS3 #2 are of the type having a mechanical latch; the switches are closed and the mechanical latches are operated by RC3A, but the release of the mechanical latches can only be effected by the momentary energization of RC3B.

Upon the manual release of motor run switch 33 at time B, the resultant energization of RC4 closes RS4 #1 to start the oscillograph motor. RS4 #2 is also caused to close shorting out the motor run switch 33 and rendering it ineffective to exert further control on the circuit. The release of the motor run switch also results in the reenergization of RC1 and time delay RC5.

The sequence of events previously described with respect to recurrent sweeping then takes place, with the additional consideration that when RS6 is caused to move to its left position at time E, the resultant energization of RC3B releases RS3 #1, thus stopping the oscillograph motor and removing the short circuit around the motor run switch 33. The control system has now been restored to its condition prior to the depression of motor run switch 33 and recurrent sweeping continues. The time delay RC5 is set so that the time interval between B and C is sufficient for the motor to attain a constant speed.

The third mode of operation, in which only one sweep occurs, is initiated by momentarily depressing motor run switch 33 with the recurrent sweep switch 31 left open. In such case RS3 #2 is also latched closed by the momentary energization of RC3A, and when the motor run switch is released, this switch RS3 #2 provides the electrical connection to RC1 and RC5 replacing the recurrent sweep switch 31. Accordingly, when RC3B is energized and RS3 #2 is allowed to open at time E, the connection to RC1 is broken and switch RS1 is restored to its normal shown position, thus restoring the potential of point 38 to its normal value $V_1$, and preventing the recurrence of a sweep until the motor run switch 33 is again depressed.

Voltmeter 46 indicates the normal potential $V_1$ of point 38 when switch 47 is in its lower position and RS1 is in its normal position. When switch 47 is in its upper position, voltmeter 46 indicates the negative voltage picked off of potentiometer resistor 48 and supplied to the sweep terminating unit 45 on lead 49. Since lead 49 supplies the negative bias for the sweep voltage limiting circuit, which bias proportionately controls the voltage value $V_2$ at which the sweep is limited, as will hereinafter be described, voltmeter 46 in this case may be made to indicate the sweep terminating voltage $V_2$ by a suitable choice of resistor connected in series therewith.

Adjustment of resistor potentiometer 48 therefore controls the value of $V_2$. If desired, the cutoff voltage $V_2$ may be made to have a higher value than the normal potential $V_1$ of point 38. $V_1$ may obviously be controlled by adjustment of potentiometer resistor 42. The rate of rise of the sweep voltage, that is, the slope of wave forms 32 and 34 between the times C and D, may be adjusted by varying the capacitance of the variable condenser 43.

Referring now also to Fig. 2, there are disclosed the details of the sweep terminating unit 45 of Fig. 1. A direct current power pack 56 (Fig. 1) provides incoming power leads at plus 350 volts, minus 400 volts, and minus 150 volts, the latter being a regulated voltage. Under normal conditions, tubes T1, T2, the left section of T4, and the right section of T5 operate to limit the sweep voltage rise at time D and to actuate relay coil RC6 at time E. The portion of the circuit associated with these tubes will be referred to as the sweep voltage limiter. The remaining portion of the sweep terminating unit, consisting of tubes T3, T5, and the right section of T4, operates to terminate the sweep after a reasonable time if, for any reason, such as M sparking, the sweep voltage limiter has failed to operate. This latter portion of the sweep terminating unit will be referred to as the proportional time delay.

Considering now the operation of the sweep voltage limiter, just prior to the beginning of the sweep, that is, before RS2 #1 opens, lead 57, which is connected to the upper side of the sweep rate condenser 43 of Fig. 1, is at approximately ground potential. The values of the various circuit elements are such that at this time the left section of T1, T2, and the right section of T5 are non-conducting, the right section of T1 is conducting, and the left section of T4 is slightly conducting.

After RS2 #1 opens and condenser 43 begins to charge, the potential of lead 57 begins to rise carrying with it the plate potential of T2 and also the grid potential of the left section of T1, this grid being connected to a point on voltage divider 58 between leads 57 and 49. Potentiometer resistor 48 may be set so that the potential of lead 49 is minus 100 volts, for example. Eventually the left section of T1 begins to conduct tending to decrease the potential of the grid of the right section of T1. However, this grid is originally at a positive potential and grid current is flowing through resistor 59. Any decrease in the grid potential is accompanied by a decrease in grid current through this resistor which tends to raise the grid potential. Because of this effect, the increase of current through the left section of T1 has little effect on the current in the right section of T1 and on the potential of the grid of T2 as long as grid current flows through resistor 59. Eventually, however, the grid potential of the right section of T1 falls to such a value that the grid current is cut off, and when this happens the full voltage amplification of both sections of T1 becomes effective to vary the grid potential of T2. Subsequent to this time a small further increase in potential of the grid of the left section of T1 effects a large increase of grid potential of T2, and T2 immediately begins to conduct. Since the main M voltage divider current now is allowed to flow through T2 by way of lead 57, no further charging of sweep rate condenser 43 is possible and the rise of the sweep voltage is terminated. This occurs at time D of Fig. 3.

Prior to the time that T2 conducts, the plate and cathode of the left section of T4 are at about ground potential and the tube is only slightly conducting. The grid of the right section of T5 is negative, and since this tube is not conducting, its plate is at about 350 volts positive. Accordingly, condenser 60 is charged to a normal value of perhaps 350 volts. When T2 conducts, the resulting flow of current through its cathode resistor 61 causes the plate potential of the left sections of T4 to rise to perhaps 15 volts thereby effecting a substantial increase in plate current in the left section of T4. Because of the normal charge on condenser 60, this increased plate current is initially supplied from the condenser. Eventually, however, the condenser will lose its charge and this plate current will be caused to flow through cathode resistors 66 and 67, increasing the grid potential of the right section of T5 to a point where that tube conducts. This occurs at time E of Fig. 3. The plate current through the right section of T5 operates relay coil RC6 which effects the closing of RS2 #1 and the discharge of condenser 43, as previously explained. Condenser 60 is unable to return immediately to its normal condition of about 350 volts as soon as current through the left section of T4 ceases. Accordingly, the right section of T5 continues to conduct for a short time, thus holding RS6 in its left position for a short time sufficient to permit the sequence of relay operations which must take place before RS6 returns to its normal right position.

It will be apparent that adjustment of potentiometer resistor 48 will effect a change in the grid potential of the left section of T1 corresponding to any particular potential of lead 57, and will therefore effect a change in the potential of lead 57 which is necessary to cause T2 to conduct. In this way, this potentiometer provides an adjustment for the cut off value $V_1$ of the sweep voltage.

The proportional time delay portion of the sweep terminating unit acts to set up at time C a dummy linear sweep voltage on the control grid of the left section of T5, which sweep voltage is unaffected by sparking and operates to energize RC6 if the sweep voltage limiter fails to operate after a reasonable time.

Just prior to time C, RS2 #2 (Fig. 2) is closed and the following conditions prevail: the control grid of T3 is at a low positive potential, T3 is conducting, and its plate is at a low positive potential; the grid of the left section of T5 is negative and this tube is not conducting; the right sections of T4 and T5 are not conducting. When RS2 #2 opens at time C, the voltage divider circuit, consisting of resistors 68 and 63 and potentiometer resistor 62, is thereby opened, the grid potential of T3 begins to drop and the plate potential of T3 begins to rise. This occurs slowly and linearly, however, because of the large value of capacitance of the condenser 64 which must simultaneously charge to the increasing potential difference between the plate and grid of T3.

The potential of the grid of the left section of T5, because of its connection to the plate of T3, will eventually rise to a value at which this tube conducts, thereby increasing the plate potential of the right section of T4 and allowing it to conduct. The current flow through the right section of T4 eventually results in the conduction of the right section of T5, the energization of relay coil RC6, and the termination of the sweep, as previously explained.

Variation of the setting of potentiometer resistor 48 obviously has the same effect on the proportional time delay as it has on the sweep voltage limiter. By controlling the initial grid potential of the left section of T5, the amount of rise of the dummy sweep before cutoff can be controlled. The rate of rise of the dummy sweep voltage may be controlled by the setting of potentiometer resistor 62 since condenser 64 must charge through this resistor. The rate of rise of the dummy sweep voltage is maintained proportional to that of the M sweep voltage by providing a mechanical connection 65 between the variable sweep rate condenser 43 and potentiometer resistor 62. To achieve proportionality between the time required for the termination of the regular M voltage sweep by the sweep voltage limiter and the time required for the termintaion of the dummy sweep by the proportional time delay, it is necessary that the rates of voltage rises on the left-hand grids of T1 and T5 be in the same proportion as the changes in bias voltage on these grids which results from an alteration in the position of the slider of potentiometer 48.

The M reference voltage tracer 23 is shown in Fig. 4. This unit is supplied with 150 volts positive direct potential and 150 volts negative direct potential from a regulated power supply 69 (Fig. 1). A voltage signal proportional to the M voltage is derived from the bottom of the M voltmeter divider 11 and is applied across a potentiometer 90 from which a proportional voltage signal of say from 90 to 150 volts may be picked off on lead 91. This latter voltage signal is connected in series opposition with a standard voltage source 92 of perhaps 125 volts, and the unbalanced voltage is applied to the grids of the double triode T6 through a protective resistance. The slider of potentiometer 90 is adjusted so that when the M voltage is swept, tube T6 remains in its operating region. When any changes occur in the M voltage, potentials proportional to these variations appear on the grids of T6.

Tube T6, which is a high mu tube having a high input impedance, is operated as a cathode follower. The negative feedback, and the high amplification factor of the tube, along with the regulated power supply, all tend to provide a highly linear and stable amplifier having a voltage amplification nearly unity. One output of the cathode follower, appearing on lead 93, is transmitted to current amplifier 27, and then to the eighth galvanometer element of the magnetic oscillograph. The other output, appearing on lead 94, is transmitted to the G and M spark detector 24, to provide an indication if, and when, an M spark occurs.

It will be recalled that the purpose of the G and M spark detector 24 of Fig. 1 is to energize the spark free indicator lamp 25 at the end of a sweep provided that no G or M sparks or other abnormalities have occurred during the sweep. An indication of an M spark is received by detector 24 as a positive pulse on lead 94 from the M voltage tracer 23, and an indication of a G spark is received as a negative pulse on lead 95 from the G voltmeter divider 9. An indication of the absence of M or G sparks and other abnormalities is received as a positive pulse of perhaps 15 volts on lead 96, which lead is connected to the cathode of tube T2 in the sweep terminating unit 45. Such a positive pulse is received during the interval while T2 conducts between times D and E provided the sweep is terminated in the normal manner by the sweep voltage limiter and not by the proportional time delay. A 350 volt positive direct current input and a 150 volt negative direct current input are also received from power pack 56.

Referring now to Fig. 5, wherein the details of the G and M spark detector 24 are shown, the double triode T11 and its associated circuit constitute a trigger circuit of the Eccles-Jordan type disclosed in Fig. 4-7, p. 173 of Ultra High Frequency Techniques, by Brainerd, Koehler, Reich, and Woodruff, D. Van Nostrand Company, Inc., New York, 1942. As thoroughly described in that publication, such a trigger circuit has two possible stable conditions of equilibrium, in the first of which the left section only of T11 is conducting and in the second of which the right section only is conducting. At the beginning of a sweep at time C, RS2 #4 closes connecting the right side of condenser 100 to ground. If prior to time C, the trigger circuit is operating in its second condition of equilibrium such that the right section of tube T11 is conducting, condensers 100 and 101 are charged so that the right side of condenser 100 is highly positive with respect to the grid of the right section of T11. Accordingly, because of the inability of these two condensers to discharge rapidly, the closing of switch RS2 #4 instantaneously applies a highly negative voltage to the grid of the right section of T11, reversing the equilibrium condition and allowing the left section of T11 to conduct. In this way it is assured that at the beginning of the sweep the trigger circuit is operating in its first or normal condition in which the left section of the tube only is conducting.

Because the right-hand grid of tube T14 is connected to the right-hand plate of tube T11, the right section of T14 is conducting only at such time as the first or normal condition of equilibrium prevails in the trigger circuit. Since an operable plate voltage is only applied to the left section of T15 when the right section of T14 is conducting, the left section of T15 is only effective to operate as an amplifier when the trigger circuit is operating under its first condition of equilibrium.

Assuming there is an operable positive plate potential on the left section of T15, a positive pulse received on its grid from the sweep terminating unit when, and if, the sweep voltage limiter operates, is amplified and applied to the grid of the right section of T15 to render it conductive. The plate current through this right section of tube T15 flows through relay coil RC7 closing relay switch RS7 of Fig. 1 and operating the spark free indicator lamp 25.

The remaining portion of detector 24 operates to reverse the trigger circuit if an M or G spark occurs during the course of a sweep, thereby rendering the left section of T15 non-conducting and incapable of amplifying and transmitting the positive pulse received on its grid when, and if, the sweep voltage limiter operates. The purpose of T12 is to control the plate potential of the left section of T13 so that it is capable of amplifying and transmitting G or M spark signals received on its grid only during the course of a sweep.

Prior to the beginning of a sweep neither section of T12 is conducting, the grid potential of each being below the cut-off valve. When relay switch RS2 #3 closes at the beginning of the sweep, however, the grid potential of the right section is raised and that section is caused to conduct, thereby applying an operable plate potential to the plate of the left section of T13 and causing that tube to conduct and become effective as an amplifier. At the end of the sweep, the positive pulse received on the grid of the left section of T12 from the sweep voltage limiter circuit by way of lead 96 causes the left section of T12 to conduct. The resulting decrease in grid potential of the right section of T12 cuts that section of the tube off and again blocks the amplifying action of the left section of T13. Accordingly the left section of T13 is effective as an amplifier only during the course of a sweep.

Negative pulses received on lead 94 as a result of M voltage sparks are applied to the grid of the left section of T13. Positive pulses received on lead 95 as a result of G voltage sparks are applied to the grid of the right section of T13. These G pulses are amplified and reversed by the right section of T13 and appear as equivalent negative pulses on the grid of the left section of that tube.

Accordingly, if either a G or M spark occurs during the course of a sweep, that is, while the left section of T13 is allowed to conduct, the resulting pulse is amplified by this tube and appears as a positive pulse on the grid of the left section of T14. In this tube the pulse is again amplified and reversed and applied as a negative pulse to the grid of the left section of T11, cutting that tube off and reversing the condition of the trigger circuit. As previously explained, the reversal of this trigger circuit from its normal condition of operation renders the left section of T15 ineffective as an amplifier and prevents the spark free signal from being given at the end of the sweep.

Summarizing the operation of the G and M spark detector, the spark free signal lamp can only be energized at the end of the sweep by a positive pulse from the sweep voltage limiter. This action, however, can be blocked by the receipt of an M or G spark signal, but only if the spark occurs during the course of the sweep. Accordingly, a spark free indication by lamp 25 is provided only if the sweep voltage limiter, rather than the proportional time delay operates to terminate the sweep, and if no M or G sparks have occurred during the course of the sweep.

Since many changes could be made in the above construction, and many apparently widely different embodiments of this invention could be made without departing from the scope thereof, it is intended that all matter contained in the above description or shown in the accompanying drawings shall be interpreted as illustrative and not in a limiting sense.

I claim:

1. In apparatus wherein an operating voltage having a linear sweep characteristic controls a physical quantity representative of a condition of operation of the apparatus, in combination, a substantially constant voltage source, and a device, connected to receive the voltage from said source as an input, for modifying said voltage to produce, as an output, an operating voltage having the required linear sweep characteristic, said device including a voltage divider connected to receive the output voltage of said device; regulating means responsive to the current through said divider for controlling said operating voltage to maintain said divider current constant, a parallel circuit having a condenser in one path and a resistor in the other, a first switch in said divider for replacing a portion of said divider by said parallel circuit when engaged, whereby upon engagement of said first switch said operating voltage is immediately changed by an amount and in a direction dependent upon the relative resistance offered by said divider portion and said parallel circuit, a second switch in series with said resistor, and means for opening said second switch to initiate the linear sweep of said operating voltage.

2. Apparatus, as claimed in claim 1, further including means responsive to the magnitude of the voltage across said parallel circuit for closing said second switch to return said operating voltage to its value prior to the opening of said second switch.

3. In apparatus wherein an operating voltage having a linear sweep characteristic controls a physical quantity representative of a condition of operation of the apparatus, in combination, means associated with said apparatus for continuously recording said physical quantity, a substantially constant voltage source, a device, connected to receive the voltage from said source as an input, for modifying said voltage to produce, as an output, an operating voltage having the required linear sweep characteristic, said device including a voltage divider connected to receive the output voltage of said device, regulating means responsive to the current through said divider for controlling said operating voltage to maintain said divider current constant, a parallel circuit having a condenser in one path and a resistor in the other, a first switch in said divider for replacing a portion of said divider by said parallel circuit when engaged, whereby upon engagement of said first switch said operating voltage is immediately changed by an amount and in a direction dependent upon the relative resistance offered by said divider portion and said parallel circuit, and a second switch in series with said resistor, manual means for simultaneously engaging said first switch and initiating operation of said recording means, and means delayably responsive to said last-named means for opening said second switch to initiate the linear sweep of said operating voltage.

4. Apparatus as claimed in claim 3, further including means responsive to the magnitude of the voltage across said parallel circuit for simultaneously stopping said recording means and returning both of said switches to their original positions.

5. Apparatus as claimed in claim 3, further including means responsive to the magnitude of the voltage across said parallel circuit for simultaneously stopping said recording means and closing said second switch.

6. In apparatus wherein an operating voltage having a linear sweep characteristic controls a physical quantity representative of a condition of operation of the apparatus, a first sweep circuit for generating the required linear sweep voltage, means associated with said apparatus for continuously recording said physical quantity, sweep terminating means responsive to a predetermined magnitude of said sweep voltage for terminating said sweep and stopping said recording means, a second sweep circuit for generating a dummy sweep voltage independent of and simultaneously with said first named sweep voltage, and additional sweep terminating means responsive to a predetermined magnitude of said dummy sweep voltage for terminating said first-named sweep and stopping said recording means.

7. Apparatus, as claimed in claim 6, further including means for simultaneously and proportionately adjusting the rate of change of both of said sweeps.

8. Apparatus, as claimed in claim 6, further including means for simultaneously and proportionately adjusting the predetermined magnitude of both of said sweep voltages to which said sweep terminating means are respectively responsive.

9. A sweep voltage terminating circuit comprising a voltage amplification stage having an input controlled from said sweep voltage, and an output, a cathode follower stage having a cathode, a control grid, and a plate, said cathode follower stage having its control grid controlled from the output of said voltage amplification stage and its plate controlled from said sweep voltage, a diode, means connecting the plate of said diode to the cathode of said cathode follower stage, a final amplifier stage having a control grid, means connecting the cathode of said diode to the control grid of said final stage, and means responsive to the plate current of said final stage for returning said sweep voltage to its initial normal value prior to the sweep.

10. A sweep voltage terminating circuit comprising a voltage amplification stage having an input controlled from said sweep voltage, and an output, a cathode follower stage having a cathode, a control grid, and a plate, said cathode follower stage having its control grid controlled from the output of said voltage amplification stage and its plate controlled from said sweep voltage, a diode, means connecting the plate of said diode to the cathode of said cathode follower stage, a final amplifier stage having a control grid and a plate, a resistance connection between the control grid of said final amplifier stage and the cathode of said diode, a capacitance connection between the plate of said final amplifier stage and the cathode of said diode, and means responsive to the plate current of said final stage for returning said sweep voltage to its initial normal value prior to the sweep.

11. An electronic time delay circuit comprising a first vacuum tube the conduction of which is controlled from a control voltage, a second grid controlled vacuum tube, a capacitance connection between the cathode of said first tube and the plate of said second tube, a resistive connection between the cathode of said first tube and the grid of said second tube, and a current responsive device in the plate circuit of said second tube.

12. A sweep circuit comprising a parallel circuit having a condenser in one path and a resistor in the other path, a normally open switch in series with said resistor, means for causing a constant current to flow through said parallel circuit, whereby when said switch is opened a sweep voltage is generated across said condenser, a first grid controlled vacuum tube amplifier connected in parallel across said parallel circuit and having its grid controlled from said sweep voltage, a second vacuum tube, means connecting the plate of said second tube to the output of said first amplifier, a final grid controlled vacuum tube, a voltage source connected as the plate supply for said final tube, a resistance connection between the cathode of said second tube and the grid of said final tube, a capacitance connection between the cathode of said seccond tube and the plate of said final tube, and means for closing said switch in response to a predetermined magnitude of the plate current of said final tube.

13. Apparatus, as claimed in claim 12, further including means responsive to the opening of said switch for initiating an independent dummy sweep voltage, and means for closing said switch in response to a predetermined magnitude of said dummy sweep voltage.

14. Apparatus, as claimed in claim 12, further including means responsive to the opening of said switch for initiating an independent dummy sweep voltage, and a fourth vacuum tube having its cathode connected to the cathode of said second tube and having its plate controlled from said dummy sweep voltage.

15. In a sweep circuit including means for initiating a primary sweep voltage and means responsive to a predetermined magnitude of said sweep voltage for terminating said sweep and returning said sweep voltage to its initial normal value, means responsive to initiation of said primary sweep for simultaneously initiating an independent dummy sweep voltage, and means responsive to a predetermined magnitude of said dummy sweep voltage for returning said primary sweep voltage to its initial normal value should said primary sweep not have previously attained its predetermined magnitude.

16. Apparatus, as claimed in claim 15, further including means for simultaneously and proportionately adjusting the rate of change of both of said sweep voltages.

17. Apparatus, as claimed in claim 15, further including means for simultaneously and proportionally adjusting the respective predetermined magnitudes of both of said sweep voltages to which said respective returning means are responsive.

18. A sweep circuit comprising a direct voltage power supply having positive and negative terminals respectively above and below ground potential, a grid controlled vacuum tube having its cathode grounded and its plate connected through a resistance to said positive terminal, a voltage divider network connected across said terminals, a connection between the grid of said tube and a slightly positive point on said divider, a switch in series with said divider on the positive side of said grid connection, and a condenser connected between the plate and grid of said tube.

19. Apparatus, as claimed in claim 18, further including means for adjusting the resistance of said divider included between said grid connection and said negative terminal.

20. Apparatus, as claimed in claim 18, further including a second divider network between said negative terminal and ground, and a resistance connection between the plate of said tube and a point on said second divider.

21. Apparatus, as claimed in claim 18, further including a second divider network between said negative terminal and ground, and a resistance connection between the plate of said tube and a variable point on said second divider.

22. In apparatus wherein an operating voltage having a linear sweep characteristic controls a physical quantity representative of a condition of operation of the apparatus, a first sweep, circuit for generating the required linear sweep voltage, means associated with said apparatus for continuously recording said physical quantity, sweep terminating means responsive to a predetermined magnitude of said sweep voltage for terminating said sweep and stopping said recording means, a second sweep circuit for generating a dummy sweep voltage independent of and simultaneously with said first named sweep voltage, additional sweep terminating means responsive to a predetermined magnitude of said dummy sweep voltage for terminating said first-named sweep and stopping said recording means, and a signal device responsive to operation of said first named sweep terminating means.

23. In apparatus wherein an operating voltage having a linear sweep characteristic controls a physical quantity representative of a condition of operation of the apparatus, a sweep circuit for generating the required linear sweep voltage, means associated with said apparatus for continuously recording said physical quantity, sweep terminating means responsive to a predetermined magnitude of said sweep voltage for terminating said sweep and stopping said recording means, means normally responsive to operation of said terminating means for actuating a signal device, and means responsive to sparking of said operating voltage for rendering ineffective said actuating means.

24. In apparatus wherein an operating voltage having a linear sweep characteristic controls a physical quantity representative of a condition of operation of the apparatus, a sweep circuit for generating the required linear sweep voltage, means associated with said apparatus for continuously recording said physical quantity, sweep terminating means responsive to a predetermined magnitude of said sweep voltage for terminating said sweep and stopping said recording means, means, including an amplifier, normally responsive to operation of said terminating means for actuating a signal device, and means responsive to sparking of said operating voltage for blocking said amplifier.

25. In apparatus wherein an operating voltage having a linear sweep characteristic controls a physical quantity representative of a condition of operation of the apparatus, a sweep circuit for generating the required linear sweep voltage, means associated with said apparatus for continuously recording said physical quantity, sweep terminating means responsive to a predetermined magnitude of said sweep voltage for terminating said sweep and stopping said recording means, means including an amplifier, normally responsive to operation of said terminating means for actuating a signal device, and means responsive to sparking of said operating voltage during the course of said sweep for blocking said amplifier.

26. In apparatus wherein an operating voltage having a linear sweep characteristic controls a physical quantity representative of a condition of operation of the apparatus, a sweep circuit for generating the required linear sweep voltage, means associated with said apparatus for continuously recording said physical quantity, sweep terminating means responsive to a predetermined magnitude of said sweep voltage for terminating said sweep and stopping said recording means, means, including a first amplifier, normally responsive to operation of said terminating means for actuating a signal device, means, including a normally blocked second amplifier, responsive to sparking of said operating voltage for blocking said first amplifier, and means responsive to said sweep voltage for unblocking said second amplifier.

27. In apparatus wherein an operating voltage having a linear sweep characteristic controls a physical quantity representative of a condition of operation of the apparatus, a sweep circuit for generating the required linear sweep voltage, means associated with said apparatus for continuously recording said physical quantity, sweep terminating means responsive to a predetermined magnitude of said sweep voltage for terminating said sweep and stopping said recording means, means, including a first amplifier, responsive to operation of said terminating means for actuating a signal device, means, including a normally blocked second amplifier, responsive to sparking of said operating voltage for blocking said first amplifier, means responsive to the initiation of said sweep for unblocking said second amplifier, and means responsive to said sweep terminating means for reblocking said second amplifier.

28. In apparatus wherein an operating voltage having a linear sweep characteristic controls a physical quantity representative of a condition of operation of the apparatus, a sweep circuit for generating the required linear sweep voltage, means associated with said apparatus for continuously recording said physical quantity, sweep terminating means responsive to a predetermined magnitude of said sweep voltage for terminating said sweep and stopping said recording means, means, normally responsive to operation of said terminating means, for actuating a signal device, and means responsive to abnormal conditions in said apparatus during the course of said sweep for rendering ineffective said last-named means.

References Cited in the file of this patent

UNITED STATES PATENTS

| 2,254,031 | Faudell | Aug. 26, 1941 |
| 2,265,290 | Knick | Dec. 9, 1941 |
| 2,414,486 | Rieke | Jan. 21, 1947 |